May 29, 1956 — M. HALLEAD — 2,747,491
TRACTOR DRAWN CULTIVATOR WITH IMPROVED LIFT
Filed Dec. 22, 1950 — 3 Sheets-Sheet 1

INVENTOR.
Mervil Hallead
BY Andrus & Sceales
Attorneys

May 29, 1956 M. HALLEAD 2,747,491
TRACTOR DRAWN CULTIVATOR WITH IMPROVED LIFT
Filed Dec. 22, 1950 3 Sheets-Sheet 2
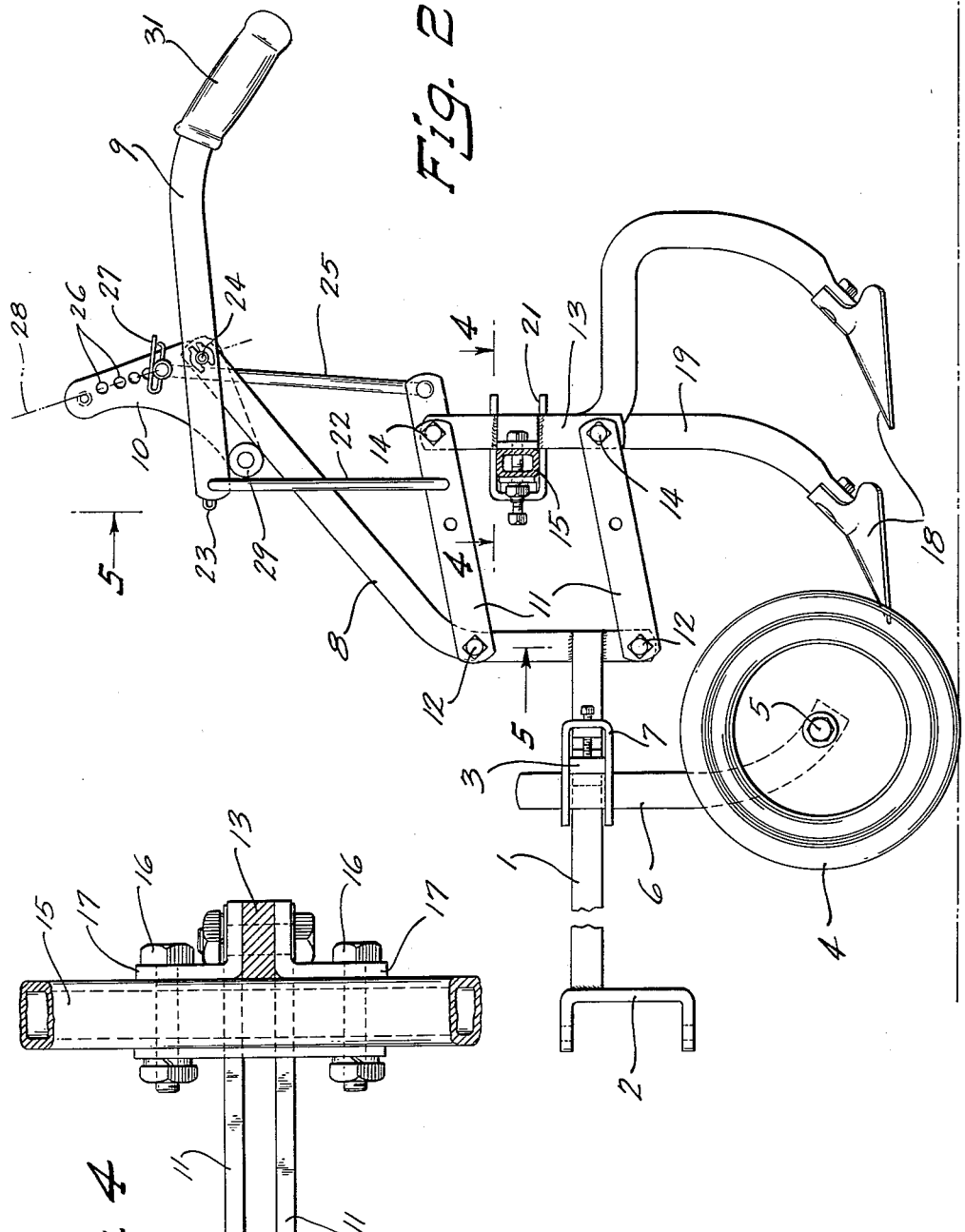
INVENTOR.
Mervil Hallead
BY
Andrus & Sceales
Attorneys May 29, 1956 M. HALLEAD 2,747,491
TRACTOR DRAWN CULTIVATOR WITH IMPROVED LIFT
Filed Dec. 22, 1950 3 Sheets-Sheet 3
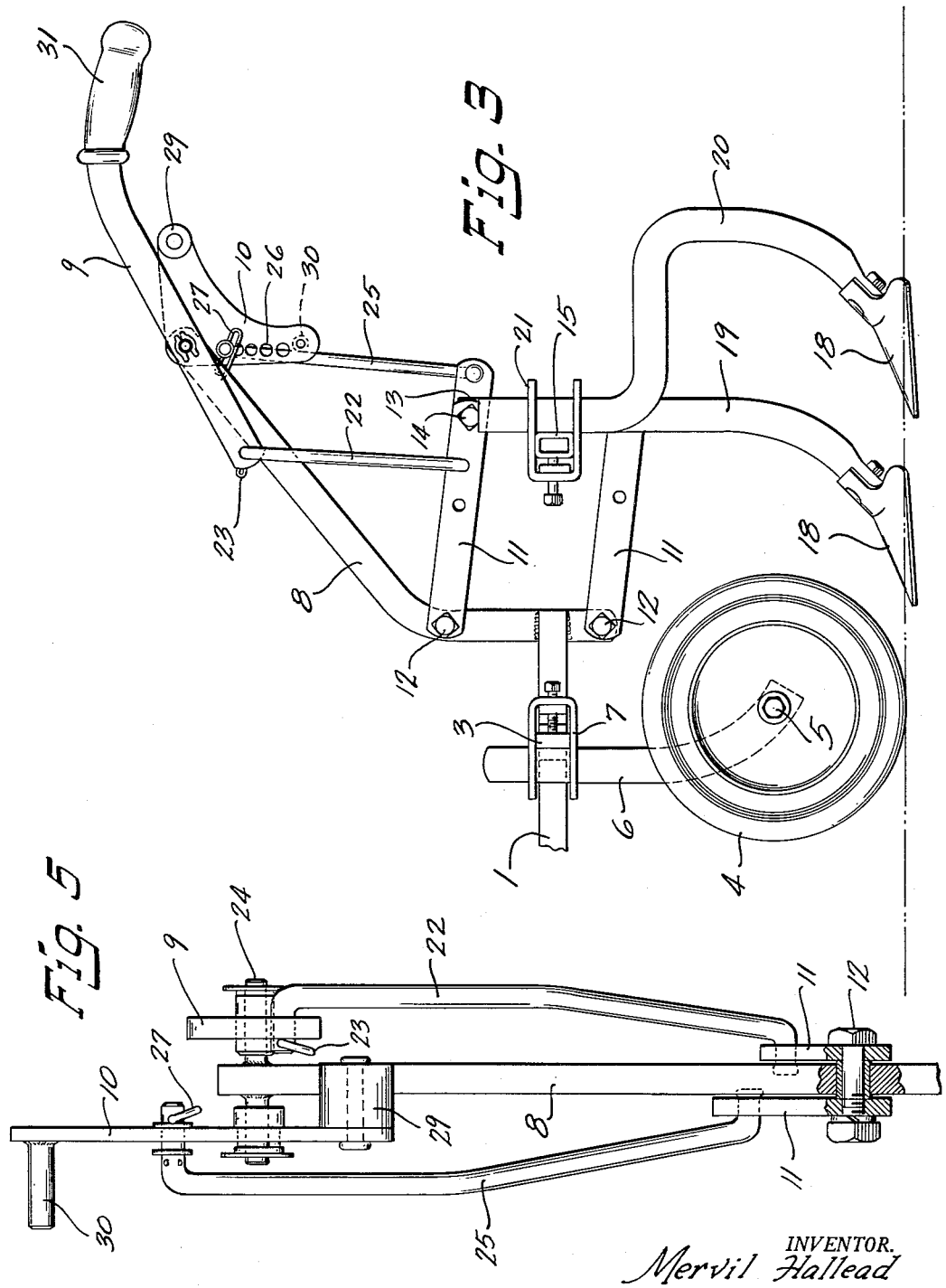
INVENTOR.
Mervil Hallead
BY
Andrus & Seeder
Attorneys

United States Patent Office 2,747,491
Patented May 29, 1956

2,747,491

TRACTOR DRAWN CULTIVATOR WITH IMPROVED LIFT

Mervil Hallead, Milwaukee, Wis., assignor to The Midland Company, South Milwaukee, Wis., a corporation of Wisconsin Application December 22, 1950, Serial No. 202,329

3 Claims. (Cl. 97—157)

This invention relates to tractor-drawn garden implements and particularly to a control mechanism for regulating and positioning the cultivator shovels or other tools.

The invention provides a manually actuated lift mechanism readily operable with a single stroke which lifts and holds the shovels in an elevated position and is easily released to return the shovels to a lowered position of the selected depth.

A principal object of the invention is to facilitate the control of the cultivator particularly in raising the shovels from the ground as at the end of a row where the operator's full attention to the control of the tractor is also required.

Another object is to provide for holding of the shovels above the ground, and for the ready release of the shovels, and eliminate latch or catch means for holding the shovel in either position.

Another object is to readily adjust the shovels in relation to the ground and additionally provide for the adjustability of the lift of the shovels from the lowered position to the raised position.

Another object is to provide a simplified adjustable mechanism which is readily actuated manually by the operator.

These and other objects and advantages will be more fully set forth in the following description of an embodiment of the invention as illustrated in the accompanying drawings.

In the drawings:

Fig. 2 is a view partially in side elevation and partially a longitudinal vertical section taken on line 2—2 of Fig. 1, and showing the shovels elevated from the ground;

Fig. 3 is a side elevation of the cultivator showing the shovels lowered into the ground;

Fig. 4 is a detail view taken on line 4—4 of Fig. 2; and

Fig. 5 is an elevation of part of the lift mechanism taken on line 5—5 of Fig. 2 partially in section of the cultivator.

Figure 1:
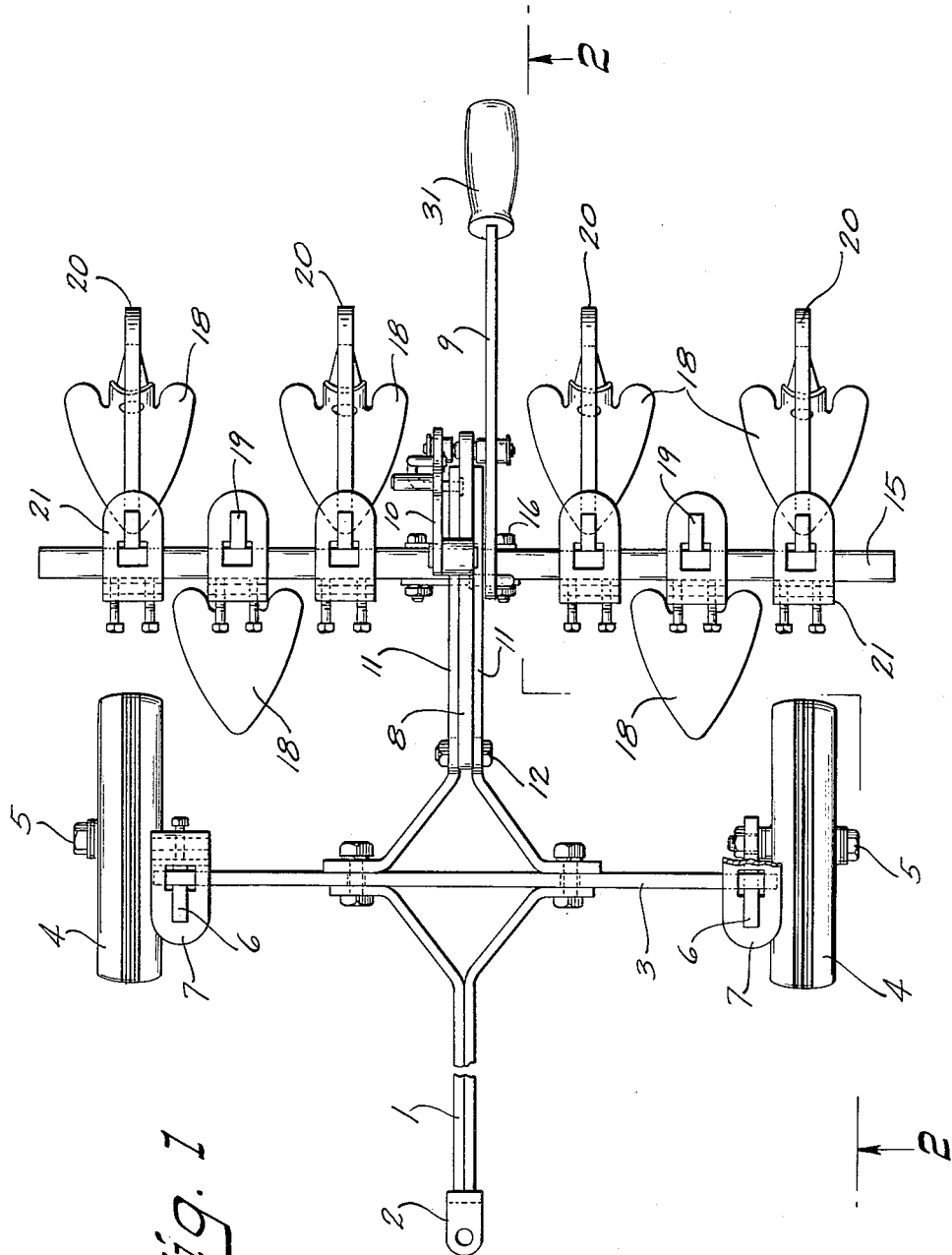
Figure 1 is a plan view of the cultivator.

The cultivator shown in the drawings includes the draw-bar 1 having the yoke 2 at the forward end for attaching to a tractor, not shown.

The cross-frame member 3 is bolted to draw bar 1 and is supported at opposite ends by the wheels 4. For this purpose, each wheel 4 is mounted on a bolt axle 5 which supports a strut 6.

The wheel struts 6 are adjustably secured to the opposite ends of cross member 3 by clamps 7 which provide for adjustment of the width between wheel treads and the relative height for operating at different levels.

The rear frame member 8 carried by cross-member 3 projects upwardly and rearwardly of the implement and pivotally carries at the upper end the hand lever 9 and crank plate 10. Lever 9 is disposed immediate to the operator's position, as will be described for accessibility and ease of operation.

The two spaced pairs of links 11 are pivotally secured to each side of frame member 8 by the bolts 12 and extend in parallel relation beneath plate 10. The upright joining link 13 is pivotally secured by bolts 14 between the corresponding free ends of links 11 and joins the latter to form a parallelogram which is unfixed and provides limited vertical movement of the joining link member 13.

The cross-bar 15 is secured to link member 13 by bolts 16 and the angle plates 17 and extends the width of the cultivator.

The cultivator shovels 18 are individually carried by the arms 19 and 20 adjustably secured to cross-bar 15 by the clamps 21. Arms 19 extend straight down from bar 15 and arms 20 adjacent to arms 19 are offset rearwardly to allow relative adjustment of shovels 18 without interference.

The rod 22 connects lever 9 and one of the upper of links 11. The pin 23 removably secures the upper end of rod 22 inserted in a hole in lever 9 forwardly of the pin 24 which latter pivotally secures lever 9 and plate 10 to the upper end of frame member 8.

A second rod 25 connects the other of the upper links 11 and plate 10 and is similarly secured at its upper end in one of a series of holes 26 in plate 10 by means of the pin 27.

Holes 26 are arranged in a series along the radius shown by the line 28 in the drawings and are spaced to receive selectively the upper end of rod 25 for the selective adjustment of the effective stroke or throw of crank plate 10.

By rotation of plate 10 on pin 24 the plate and rod 25 are movable to upper and lower dead center positions. In both dead center positions the radius 28 and rod 25 are parallel. In the upper dead center position the upper end of rod 25 is above pin 24. In the lower dead center position the rod is below the pin 24.

In the raised position shown in Fig. 2, cross bar 15 is supported by rod 25 and plate 10 to hold shovels 18 above the ground. The abutment member 29, which may serve also as a weight as will be described, is carried by plate 10 to engage and rest upon the upper side of frame member 8 and limits rotation of plate 10 in a counter-clockwise direction as shown in Fig. 2.

In the position of plate 10 as shown in Fig. 2, radius 28 and holes 26 are disposed forwardly of their upper dead center positions referred to above. The weight of cross bar 15 and shovels 18, tending to rotate the plate counter-clockwise, holds the plate in the position with stop member 29 against frame 8.

In the lowered position shown in Fig. 3 cross bar 15 is supported by rod 25 and plate 10 to hold shovels 18 below or at the selected depth in the ground. Plate 10 is in a position which places radius 28 and holes 26 generally rearwardly of their lower dead center positions. The weight of cross bar 15 and shovels 18 tends to rotate the plate clockwise as viewed in Fig. 3 to the lower dead center position.

The small handle 30 carried by plate 10 as shown in Fig. 5 projects from the plate to engage rod 25 in the position shown in Fig. 3 and prevents the rotation of plate 10 to the lower dead center position so that in raising shovels 18 the rotation of crank plate 10 by rod 25 can always be effected as will be described.

Shovels 18 carried by cross bar 15 may be raised or lowered as with handle 30 by rotating plate 10 between the two limits of rotation effected by member 29 and handle 30.

Shovels 18 may also be raised by means of the lever 9 and rod 22 which additionally effects an initial rotation of plate 10 from its position shown in Fig. 3.

Lever 9 carries the handle 31 at its rear end which is movable downwardly and is disposed immediately in front of the operator where the operator can apply the greater part of his own weight directly upon the handle to effect raising of the shovels 18.

In most operations shovels 18 are disposed below the level of the soil and tend to be firmly embedded. The length of lever 9 affords a mechanical advantage for lifting the shovels out of the ground and eliminates the necessity of stopping the tractor.

Crank plate 10 with weight member 29 is provided with a center of balance which is eccentric of pin 24 and is offset approximately 90° counterclockwise of radius 28 so that the plate tends to be secured gravitationally in the two positions described and shown in the drawings.

Crank plate 10 including weight member 29 should be of substantial weight to provide a rotational moment of inertia. The rotation of crank plate 10 by movement of lever 9 is effected only from the lower position shown in Fig. 3 to the upper dead center position. Maximum rotational velocity, however, is reached by plate 10 at upper dead center and the moment of inertia by reason thereof and the weight of crank plate 10 is effective to rotate the crank plate to the position shown in Fig. 2. The inertia of crank plate 10 is sufficient usually to overcome any force which the operator may continue momentarily to effect through lever 9 which operates in the opposite direction.

In raising the shovels, weight member 29 swings over the axis of plate 10 and holds the shovels in the raised position, eliminating ratchet and pawl or other latch means which are less dependable. Weight member 29 holds the shovels in the raised position without the possibility of release because of vibration, accidental displacement, or the like as in the use of a latch. At the same time release and lowering of the shovels is always immediately possible.

The series of holes 26 provides adjustment of the height or the extent of the lift of the shovels.

When the shovels are lowered, handle 31 is disposed at a height which allows the operator to apply his weight to lever 9. When the shovels are raised, handle 31 is secured by plate 10 in a convenient, lower position for lifting and manipulation of the implement.

Various embodiments of the invention may be employed within the scope of the accompanying claims.

What is claimed is:

1. In a tractor-drawn garden implement including a series of tools for working the soil, a frame including a rear frame member, a cross member adapted to carry the tools at selected depths in the soil, means connecting said cross member and said frame for drawing the tools and providing limited vertical movement allowing raising of said cross member and the tools above the level of the soil, a crank plate pivotally carried by said rear frame member above said cross member and having a series of holes arranged on a radius of the pivotal axis of said crank, linkage means connecting said cross member and said crank plate in one of the holes of said plate, said crank plate having abutment means limiting rotation of said plate between upper and lower positions, the lower position being spaced rotationally from the lower dead center of said crank respecting said connecting member and at which said cross member and tools are supported thereby from said frame member in a lowered position, the upper position being located over and past the upper dead center of said crank respecting said connecting member and at which said cross member and tools are supported from said frame member in a raised position, said crank plate having an eccentric weight securing by gravity the plate in the upper and lower positions referred to and of substantial moment during movement between the positions, and a manually operable handle means carried by said frame rearwardly thereof and forwardly of the operator's position and connected with said cross member to effect raising of said cross member with manual downward movement of said handle means, said series of holes providing for the adjustment of the lift of the tools effected by said handle means.

2. In a tractor-driven garden implement including a series of tools for working the soil, a frame, means connecting said tools and said frame for drawing the tools at selected depths in the soil and providing limited relative vertical movement allowing raising of the tools above the level of the soil, support means for said tools including a crank and linkage means connecting said crank and said tools, abutment means limiting rotation of said crank between upper and lower positions, the lower position being spaced rotationally from the lower dead center of said crank respecting said connecting member and at which said tools are supported thereby from said frame in a lower position, the upper position being located over and past the upper dead center of said crank respecting said connecting member and at which said tools are supported from said frame member in a raised position, and a manually operable lever having handle means carried by said frame rearwardly thereof and forwardly of the operator's position, said lever being connected to said tools and disposed for raising of the tools with the manual downward movement of said handle means, said crank providing the securement of the tools in the raised position and the securement of the handle means in a convenient lower position for lifting of the implement and manipulation of the implement by said same handle means.

3. In a tractor-driven garden implement including a series of tools for working the soil, a frame, means connecting said tools and said frame for drawing the tools at selected depths in the soil and providing limited relative vertical movement allowing raising of the tools above the level of the soil, support means for said tools including a crank and linkage means connecting said crank and said tools, abutment means limiting rotation of said crank between upper and lower positions, the lower position being spaced rotationally from the lower dead center of said crank respecting said connecting member and at which said tools are supported thereby from said frame in a lower position, the upper position being located over and past the upper dead center of said crank respecting said connecting member and at which said tools are supported from said frame member in a raised position, a weight carried by said crank plate securing by gravity the plate in the upper and lower positions referred to and of substantial moment during movement between the positions, and a manually operable lever having handle means carried by said frame rearwardly thereof and forwardly of the operator's position, said lever being connected to said tools and disposed for raising of the tools with the manual downward movement of said handle means, said crank providing the securement of the tools in the raised position and the securement of the handle means in a convenient lower position for lifting of the implement and manipulation of the implement by said same handle means.

References Cited in the file of this patent

UNITED STATES PATENTS

| 575,754 | Davis | Jan. 26, 1897 |
| 810,779 | Lindgren | Jan. 23, 1906 |
| 1,215,942 | Kuen | Feb. 13, 1917 |

FOREIGN PATENTS

| 755,717 | France | Sept. 11, 1933 |